United States Patent
Yang et al.

(10) Patent No.: US 6,736,039 B2
(45) Date of Patent: May 18, 2004

(54) WORKPIECE SHIFT APPARATUS FOR PUNCH PRESS

(75) Inventors: Chia Hsiang Yang, Tu-Chen (TW); Liu Sheng Tang, Shenzhen (CN); You Cai Yang, Shenzhen (CN); Tai Ping Chou, Shenzhen (CN); Zai Xing Wu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 66 days.

(21) Appl. No.: 10/158,352

(22) Filed: May 29, 2002

(65) Prior Publication Data

US 2003/0111783 A1 Jun. 19, 2003

(30) Foreign Application Priority Data

Dec. 14, 2001 (TW) ...................................... 90221902 U

(51) Int. Cl.$^7$ ................................................ B26D 7/01
(52) U.S. Cl. ............................. 83/211; 83/219; 83/227; 83/685
(58) Field of Search ........................... 83/202, 207, 211, 83/212, 219, 220, 221, 225–230, 685, 684

(56) References Cited

U.S. PATENT DOCUMENTS

| | | | | |
|---|---|---|---|---|
| 4,173,161 A | * | 11/1979 | Arends et al. ................. | 83/278 |
| 5,857,397 A | * | 1/1999 | Matsubayashi et al. ....... | 83/556 |
| 5,878,640 A | * | 3/1999 | Haar ........................... | 83/206 |
| 6,505,535 B1 | * | 1/2003 | Kurita et al. .................. | 83/34 |

* cited by examiner

*Primary Examiner*—Charles Goodman
(74) *Attorney, Agent, or Firm*—Wei Te Chung

(57) ABSTRACT

A workpiece shift apparatus includes a bottom plate (10), a middle plate (40), and a top plate (70). A first pushing plate (26) is slidably attached on the bottom plate. The first pushing plate includes cutouts (30) in one edge thereof, and arcuate steps (32) on an opposite edge thereof. A first pushing means is installed on the bottom plate, and includes a handspike (19). The handspike sequentially engages in the cutouts to move the first pushing plate in a first direction. The steps thereby push the combined middle plate and top plate in a second direction perpendicular to the first direction. A second pushing plate (56) similar to the first pushing plate, and a second pushing means similar to the first pushing means are attached on the middle plate for pushing the top plate in the first direction.

22 Claims, 4 Drawing Sheets

WORKPIECE SHIFT APPARATUS FOR PUNCH PRESS

BACKGROUND OF THE INVENTION

1. Field of the Invention

The present invention relates to shift apparatuses for industrial machining, and particularly to workpiece shift apparatuses used for punch presses.

2. Related Art

Various electronic devices are ubiquitous in modern society. For example, computer servers and routers pervade the business world. Many such electronic devices generate a lot of heat during normal operation. This can deteriorate their operational stability and damage associated electronic device. Thus vents are defined in such electronic devices for facilitating air flow and heat dissipation.

Conventional means for machining vents in a workpiece comprise, for example, laser machining and conventional punch machining. Laser machining is costly and is therefore not widely used. Conventional punch machining requires manual manipulation to control movements of workpieces. This is slow and unsafe. Furthermore, the workpieces are liable to be imprecisely machined.

A workpiece shift apparatus for a punch press which overcomes the above-mentioned problems and shortcomings is desired.

SUMMARY OF THE INVENTION

Accordingly, an object of the present invention is to provide a workpiece shift apparatus which can readily and precisely move workpieces on a punch press.

To achieve the above-mentioned object, a workpiece shift apparatus in accordance with the present invention comprises a bottom plate, a middle plate slidably attached on the bottom plate, and a top plate slidably attached on the middle plate. The bottom plate includes a first large piston cylinder installed thereon. The first large piston cylinder has a first large piston rod that is extendable in a first direction. A first small piston cylinder is installed on a first supporting block, and the first supporting block is connected with an end of the first large piston rod. The first small piston cylinder has a first small piston rod. The first small piston rod is extendable in a second direction that is perpendicular to the first direction. A first handspike is connected to and movable with the first small piston rod. A first pushing plate is slidably attached on the bottom plate. The first pushing plate defines a plurality of first cutouts in one edge thereof, and forms a plurality of arcuate first steps on an opposite edge thereof. When the first pushing plate is moved in the first direction, the first steps push the combined middle plate and top plate in the second direction. The first handspike is sequentially engaged in the first cutouts, to allow the first pushing plate to be sequentially moved in the first direction. The combined middle plate and top plate can thereby be sequentially pushed in the second direction.

The middle plate includes a second large piston cylinder installed thereon. The second large piston cylinder is oriented perpendicular to the first large piston cylinder. The second large piston cylinder has a second large piston rod which is extendable in a third direction that is opposite to the second direction. A second small piston cylinder is installed on a second supporting block, and the second supporting block is connected with an end of the second large piston rod. The second small piston cylinder is oriented perpendicular to the first small piston cylinder. The second small piston cylinder has a second small piston rod. The second small piston rod is extendable in the first direction. A second handspike is connected to and movable with the second small piston rod. A second pushing plate is slidably attached on the middle plate, and is oriented perpendicular to the first pushing plate. The second pushing plate defines a plurality of second cutouts in one edge thereof, and forms a plurality of arcuate second steps on an opposite edge thereof. When the second pushing plate is moved in the third direction, the second steps push the top plate in the first direction. The second handspike is sequentially engaged in the second cutouts, to allow the second pushing plate to be sequentially moved in the third direction. The top plate can thereby be sequentially pushed in the first direction.

Other objects, advantages and novel features of the present invention will be drawn from the following detailed description of preferred embodiment of the present invention with attached drawings, in which:

DESCRIPTION OF THE PREFERRED EMBODIMENT

Figure 1:
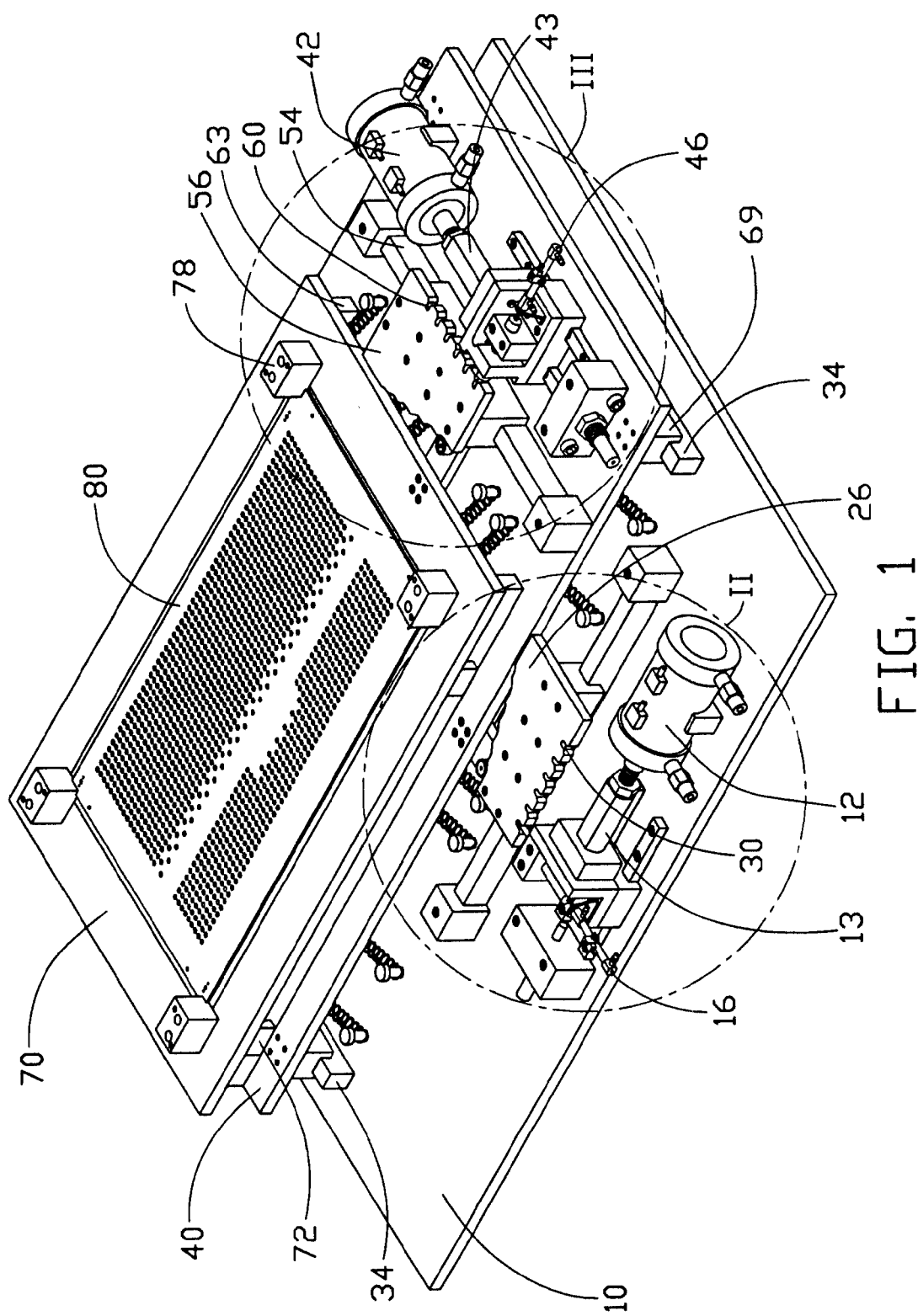
FIG. 1 is a perspective view of a workpiece shift apparatus in accordance with the present invention, together with a workpiece.

Referring to FIG. 1, a workpiece shift apparatus for a punch press in accordance with a preferred embodiment of the present invention comprises a bottom plate 10, a middle plate 40 slidably attached on the bottom plate 10, and a top plate 70 slidably attached on the middle plate 40.

Figure 2:
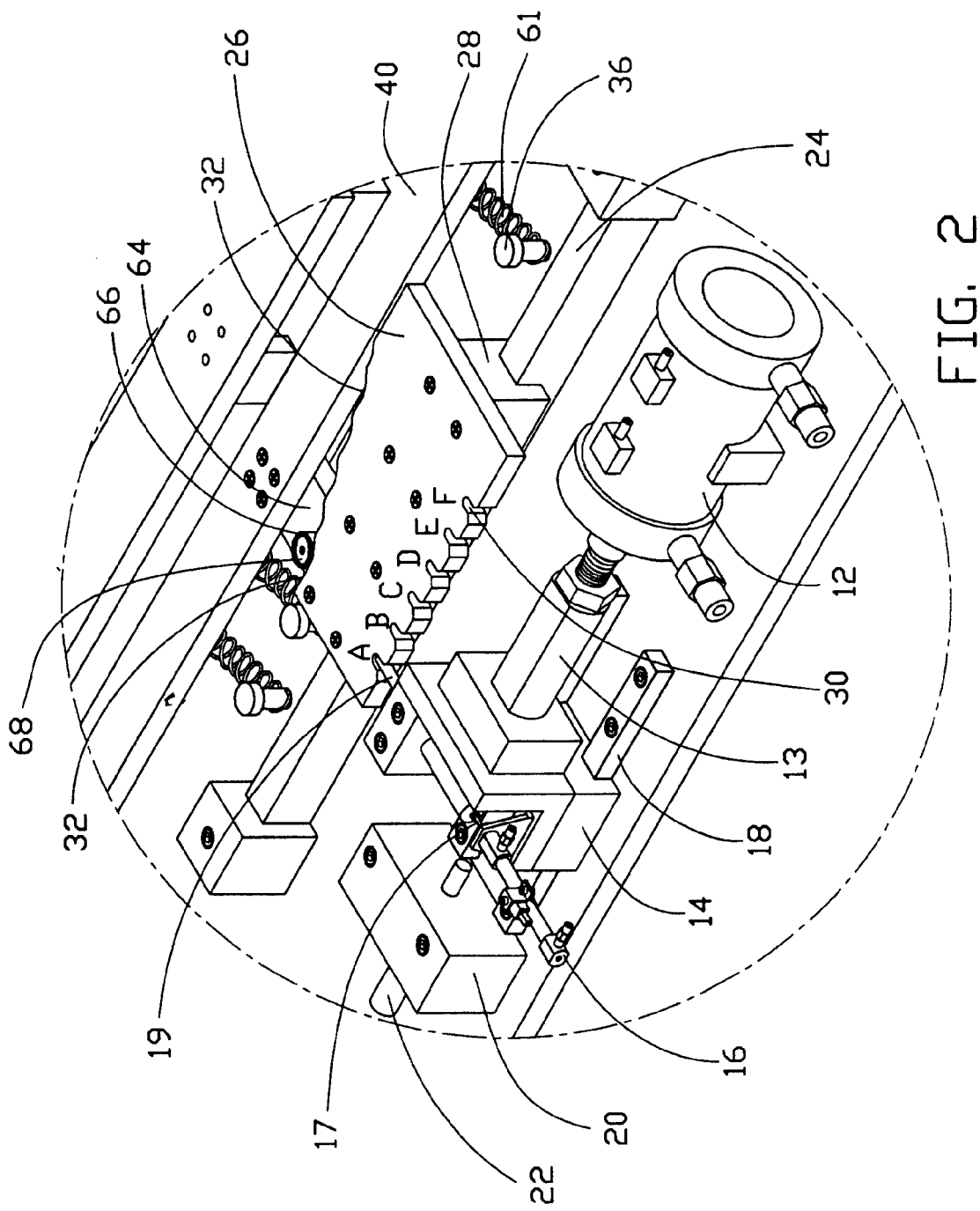
FIG. 2 is an enlarged view of a circled portion II of FIG. 1.

Referring also to FIG. 2, the bottom plate 10 has a first large piston cylinder 12 installed thereon. A first large piston rod 13 extends from the first large piston cylinder 12. The first large piston rod 13 is extendable away from the first large piston cylinder 12 in a first direction. A pair of first guiding railways 18 is secured on the bottom plate 10. A first supporting block 14 is slidably attached on the first railways 18. The first supporting block 14 is securely engaged with a free end of the first large piston rod 13, and is therefore movable with the first piston rod 13 in the first direction. A first small piston cylinder 16 is installed on the first supporting block 14. A first small piston rod 17 extends from the first small piston cylinder 16. The first small piston rod 17 is extendable away from the first small piston cylinder 16 in a second direction that is perpendicular to the first direction. A first handspike 19 is connected with a free end of the first small piston cylinder 16, and is movable with the first small piston cylinder 16. A first stop block 20 is secured on the bottom plate 10, and abuts ends of the first railways 18. The first stop block 20 is for limiting sliding movement of the first supporting block 14 along the first railways 18. A first buffer 22 is installed in the first stop block 20, for buffering impact between the first supporting block 14 and the first stop block 20. A first bar 24 is secured on the bottom plate 10 parallel to the first large piston rod 13. A first sliding block 28 is slidably attached on the first bar 24. A first pushing plate 26 is securely attached on the first sliding block 28. A plurality of evenly-spaced first cutouts 30 is defined in one side edge of the first pushing plate 26 generally facing the first large piston rod 13. A distance traveled by the first large piston rod 13 from a retracted position to an extended position is equal to a distance between midpoints of each of two adjacent first cutouts 30. In the preferred embodiment, there are six first cutouts 30 respectively designated 30A–30F. A plurality of evenly-spaced and continuous arcuate first steps 32 is formed on an opposite side edge of the first pushing plate 26. A distance between midpoints of each of two adjacent first steps 32 is equal to the distance between the midpoints of each of two adjacent first cutouts 30. A first pushing block 64 is secured under the middle plate 40. A first inner roller 68 is secured on the pushing block 64. A first outer roller 66 is disposed around the first inner roller 68, and is rotatable relative to the first inner roller 68. An external surface of the first outer roller 66 fits an external surface of each first step 32. A plurality of first retaining nails 36 is secured in the bottom plate 10. A plurality of first springs 61 is respectively connected between the first retaining nails 36 and the middle plate 40, for buffering movement of the middle plate 40 relative to the bottom plate 10. A pair of spaced first parallel rails 34 is secured on the bottom plate 10, near respective opposite edges of the bottom plate 10 and perpendicular to the first bar 24 (see FIG. 1).

Figure 3:
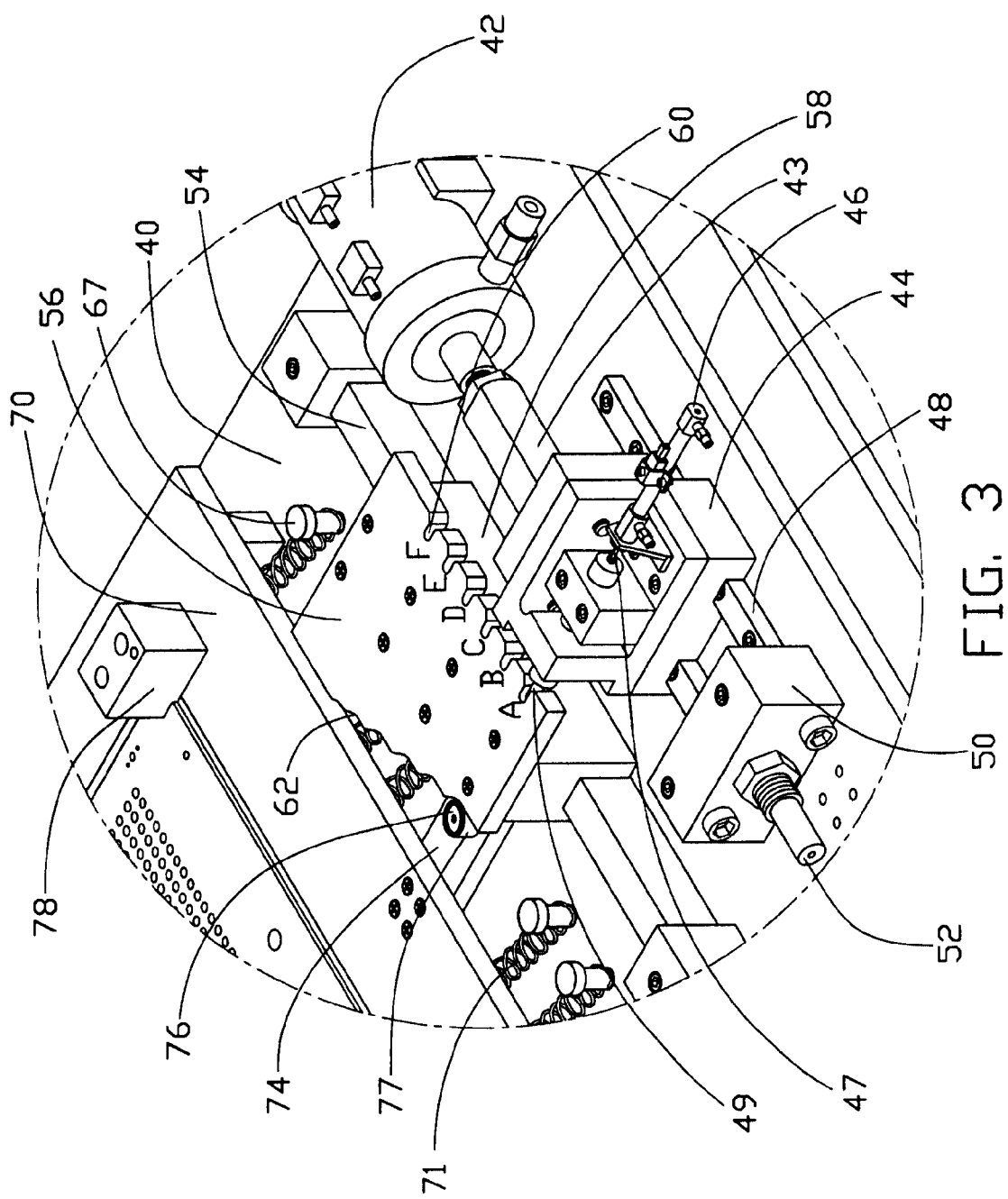
FIG. 3 is an enlarged view of a circled portion III of FIG. 1.

Referring also to FIG. 3, the middle plate 40 is located above the bottom plate 10. A second large piston cylinder 42 is installed on the middle plate 40, and is oriented perpendicular to the first large piston cylinder 12 of the bottom plate 10. A second large piston rod 43 extends from the second large piston cylinder 42, and is extendable away from the second large piston cylinder 42 in a third direction that is opposite to the second direction. A pair of second guiding railways 48 is secured on the middle plate 40. A second supporting block 44 is slidably attached on the second railways 48. The second supporting block 44 is securely engaged with a free end of the second piston rod 43, and is therefore movable with the second piston rod 43 in the third direction. A second stop block 50 is secured on the middle plate 40, and abuts ends of the second railways 48. The second stop block 50 is for limiting sliding movement of the second supporting block 44 along the second railways 48. A second buffer 52 is installed in the second stop block 50, for buffering impact between the second supporting block 44 and the second stop block 50. A second small piston cylinder 46 is installed on the second supporting block 44. A second small piston rod 47 extends from the second small piston cylinder 46. The second small piston rod 47 is extendable away from the second small piston cylinder 46 in the first direction. A second handspike 49 is connected with a free end of the second small piston rod 47, and is movable with the second small piston rod 47. A second bar 54 is secured on the middle plate 40 parallel to the second large piston rod 43. A second sliding block 58 is slidably attached on the second bar 54. A second pushing plate 56 is securely attached on the second sliding block 58, and is oriented perpendicular to the first pushing plate 26. A plurality of evenly-spaced second cutouts 60 is defined in one side edge of the second pushing plate 56 generally facing the second piston rod 43. A distance traveled by the second large piston rod 43 from a retracted position to an extended position is equal to a distance between midpoints of each of two adjacent second cutouts 60. In the preferred embodiment, there are six second cutouts 60 respectively designated 60A–60F. A plurality of evenly-spaced and continuous arcuate second steps 62 is formed on an opposite side edge of the second pushing plate 56. A distance between midpoints of each of two adjacent second steps 62 is equal to the distance between the midpoints of each of two adjacent second cutouts 60. A second pushing block 74 is secured under the top plate 70. A second inner roller 76 is secured on the second pushing block 74. A second outer roller 77 is disposed around the second inner roller 76, and is rotatable relative to the second inner roller 76. An external surface of the second outer roller 77 fits an external surface of each second step 62. A plurality of second retaining nails 67 is secured on the middle plate 40. A plurality of second springs 71 is respectively connected between the second retaining nails 67 and the top plate 70, for buffering movement of the top plate 70 relative to the middle plate 40.

Referring particularly to FIG. 1, a pair of parallel second rails 63 is secured on opposite sides of the middle plate 40. The second rails 63 are near respective opposite edges of the middle plate 10, and perpendicular to the second bar 54. Four first guideways 69 are respectively secured to four corners of an underside of the middle plate 40. The first guideways 69 are slidable along the first rails 34 of the bottom plate 10, and can thereby guide the middle plate 40 to move relative to the bottom plate 10.

The top plate 70 is located above the middle plate 50. Four second guideways 72 are respectively secured to four corners of an underside of the top plate 70. The second guideways 72 are slidable along the second rails 63 of the middle plate 40, and can thereby guide the top plate 70 to move relative to the middle plate 40. Four location blocks 78 are respectively attached on four corners of the top plate 70, for retaining a workpiece 80 on the top plate 70. A plurality of punches (not shown) of the punch press is arranged in a regular array to correspond to an array of reference spots 84 of the workpiece 80 (see FIG. 4).

Figure 4:
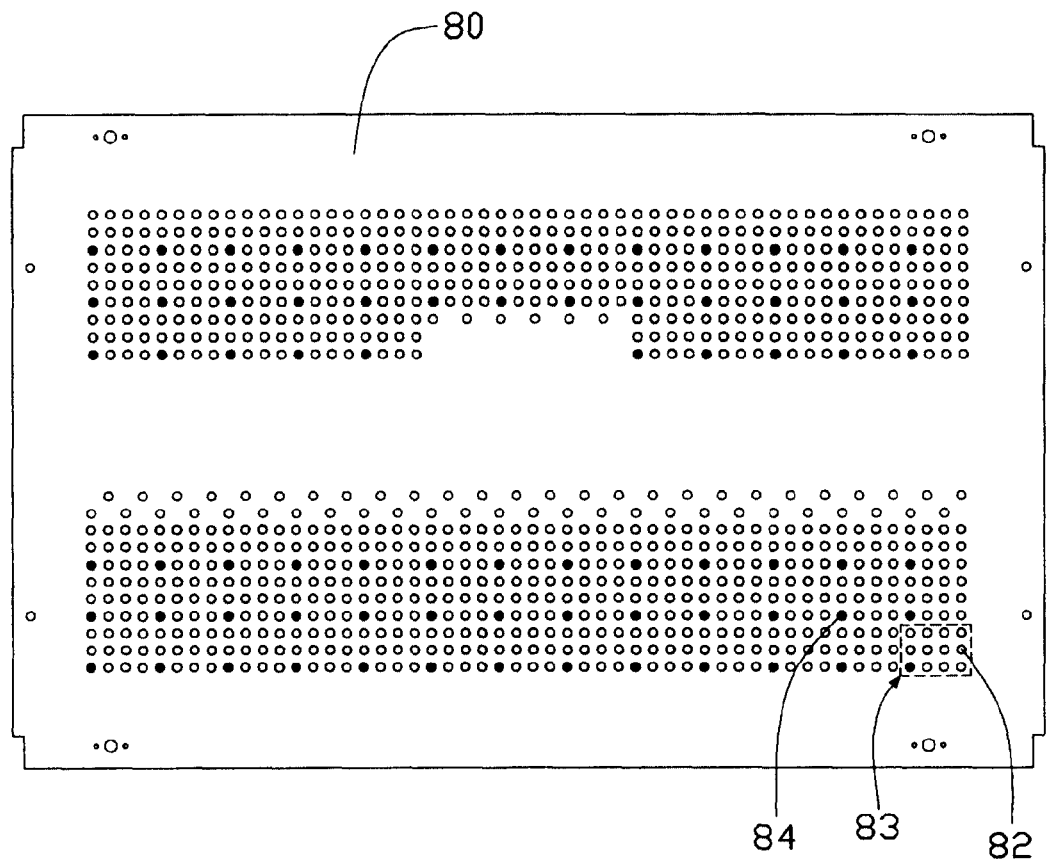
FIG. 4 is an enlarged top plan view of the workpiece of FIG. 1, viewed from another aspect and showing an array of vents comprising a plurality of identical sub-arrays of vents.
Figure 5:
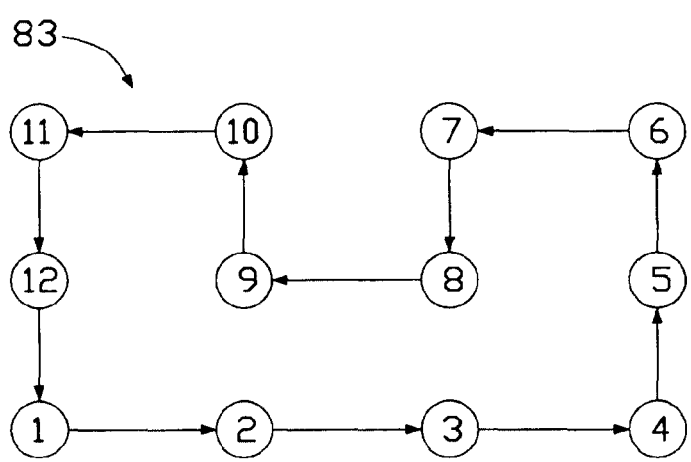
FIG. 5 is an enlarged schematic view of vents of one of the sub-arrays of vents of the workpiece of FIG. 4, showing a sequence of formation of the vents of all the sub-arrays of vents.

Referring to FIGS. 4 and 5, according to the preferred embodiment, the workpiece 80 requires a plurality of vents 82 to be punched therein. The vents 82 are to be arranged in a regular array. The regular array comprises a plurality of identical sub-arrays 83 of the vents 82. Each sub-array 83 spans four vents 82 in a longitudinal direction, and three vents 82 in a transverse direction. Thus, each sub-array 83 can be represented as shown in FIG. 5.

In operation, the workpiece 80 is placed on a workbench of the top plate 70. The first large piston rod 13 of the first large piston cylinder 12 is located at a retracted position. The first small piston rod 17 is extended to an extended position. The first handspike 19 is inserted into an endmost first cutout 30A of the first pushing plate 26 that is farthest from the first large piston cylinder 12. The second large piston rod 43 of the second large piston cylinder 42 is located at a retracted position. The second small piston rod 47 of the second small piston rod 46 is extended to an extended position. The second handspike 49 is inserted into an endmost second cutout 60A of the second pushing plate 56 that is farthest from the second large piston cylinder 42. The punches are stamped onto the workpiece 80. The vents 82 corresponding to position 1 (see FIG. 5) in all of the sub-arrays 83 are thus punched in the workpiece 80.

Then, the second large piston rod 43 is extended to an extended position. The second pushing plate 56 is pushed in the third direction by the second handspike 49, and an adjacent second step 62 is moved to abut the second outer roller 77. The second pushing block 74 is pushed in the first direction by the second pushing plate 56. The top plate 70 is therefore moved away from the second large piston cylinder 42 in the first direction, with the second guideways 72 sliding along the second rails 63. The second small piston rod 47 is retracted to a retracted position. The second handspike 49 is therefore pulled away from the second cutout 60A. The second large piston rod 43 is retracted to the retracted position. The second small piston rod 47 is extended to the extended position. The second handspike 49 is therefore inserted into an adjacent second cutout 60B. The punches are stamped onto the workpiece 80. The vents 82 corresponding to position 2 (see FIG. 5) in all of the sub-arrays 83 are thus punched in the workpiece 80.

The vents 82 corresponding to positions 3–4 (see FIG. 5) in all of the sub-arrays 83 are punched by movements similar to the above-described movements required to punch the vents 82 corresponding to position 2. At this stage, the second handspike 49 is inserted into the second cutout 60D. The first piston rod 13 is extended, causing the first handspike 19 to push the first pushing plate 26 in the first direction. An adjacent first step 32 is moved to abut the first outer roller 66. The first pushing block 64 is moved in the second direction. The combined top plate 70 and middle plate 40 is therefore moved away from the first large piston cylinder 12 in the second direction, with the first guideways 52 sliding along the first rails 34. The first small piston rod 17 is retracted to a retracted position. The first handspike 19 is therefore pulled away from the first cutout 30A. The first large piston rod 13 is retracted to the retracted position. The first small piston rod 17 is extended to the extended position. The first handspike 19 is therefore inserted into the adjacent first cutout 30B. The punches are stamped onto the workpiece 80. The vents 82 corresponding to position 5 (see FIG. 5) in all of the sub-arrays 83 are thus punched in the workpiece 80. The above-described operations are repeated until the vents 82 corresponding to position 6 (see FIG. 5) in all of the sub-arrays 83 are punched.

Then the second small piston rod 47 is retracted to the retracted position, and the second handspike 49 is pulled away from the second cutout 60D. The second large piston cylinder 42 is extended to the extended position. The second small piston rod 47 is extended to the extended position, and the second handspike 49 is therefore inserted into the adjacent second cutout 60C. The second large piston cylinder 42 is retracted to the retracted position. The second pushing plate 56 is moved in the second direction away from the first large piston cylinder 12. The top plate 70 is moved toward the second large piston cylinder 42. The punches are stamped onto the workpiece 80. The vents 82 corresponding to position 7 (see FIG. 5) in all of the sub-arrays 83 are thus punched. The vents 82 corresponding to positions 9 and 11 (see FIG. 5) in all of the sub-arrays 83 are punched by movements similar to the above-described movements required to punch the vents 82 corresponding to position 7. The vents 82 corresponding to positions 8 and 12 (see FIG. 5) in all of the sub-arrays 83 are punched by movements of the first large piston rod 13 and the first small piston rod 17 that are similar to the above-described movements of the second large piston rod 43 and the second small piston rod 47 required to punch the vents 82 corresponding to position 7. The vents 82 corresponding to position 10 (see FIG. 5) in all of the sub-arrays 83 are punched by movements similar to the above-described movements required to punch the vents 82 corresponding to position 6. All the vents 82 are thus punched. Understandably, the embodiment relates to the evenly dispatched punched holes. Anyhow, different unevenly arranged cutouts along the side edge of the pushing plate may implement punching holes at irregular positions.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A workpiece shift apparatus comprising:
    a bottom plate, a first large piston cylinder being installed on the bottom plate and having a first large piston rod being movable in a first direction, a first small piston cylinder being movably connected with an end of the first large piston rod and having a first small piston rod being movable in a second direction perpendicular to the first direction, a first handspike being connected to and movable with the first small piston rod;
    a first pushing plate movably mounted on the bottom plate, the first pushing plate having a plurality of first cutouts defined in one edge thereof for receiving the first handspike, and a plurality of arcuate first steps formed at an opposite edge thereof;
    a middle plate slidably attached on the bottom plate, a second large piston cylinder being installed on the middle plate and having a second large piston rod being movable in a third direction that is opposite to the second direction, a second small piston cylinder being movably connected with an end of the second large piston rod and having a second small piston rod being movable in the first direction, a second handspike being connected to and movable with the second small piston rod;
    a second pushing plate movably mounted on the middle plate, the second pushing plate having a plurality of second cutouts defined in one edge thereof for receiving the second handspike, and a plurality of arcuate second steps formed at an opposite edge of the second pushing plate; and
    a top plate movably attached on the middle plate and adapted for holding a workpiece thereon, wherein
    the first steps of the first pushing plate push the combined middle plate and top plate in the second direction when the first handspike pushes the first pushing plate in the first direction;
    the second steps of the second pushing plate push the top plate in the first direction when the second handspike pushes the second pushing plate in the third direction; and
    the first handspike is sequentially engaged in the first cutouts to move the first pushing plate in the first direction, thereby pushing the combined middle plate and top plate in the second direction, and the second handspike is sequentially engaged in the second cutouts to move the second pushing plate in the third direction, thereby pushing the top plate in the first direction.

2. The workpiece shift apparatus as claimed in claim 1, further comprising a first pushing block secured under the middle plate, a first inner roller secured on the first pushing block, and a first outer roller disposed around the first inner roller and rotatable relative to the first inner roller, wherein when the first pushing plate is pushed in the first direction, at least one of the first steps pushes the first outer roller in the second direction to thereby move the combined middle plate and top plate in the second direction.

3. The workpiece shift apparatus as claimed in claim 2, further comprising a second pushing block secured under the top plate, a second inner roller secured on the second pushing block, and a second outer roller disposed around the second inner roller and rotatable relative to the second inner roller, wherein when the second pushing plate is pushed in the third direction, at least one of the second steps pushes the second outer roller in the first direction to thereby move the top plate in the first direction.

4. The workpiece shift apparatus as claimed in claim 3, wherein at least one first spring is connected between the middle plate and the bottom plate for buffering movement of the combined middle plate and top plate relative to the bottom plate, and at least one second spring is connected between the top plate and the middle plate for buffering movement of the top plate relative to the middle plate.

5. The workpiece shift apparatus as claimed in claim 1, wherein a first stop block is secured on the bottom plate for limiting movement of the first large piston rod, and a second stop block is secured on the middle plate for limiting movement of the second large piston rod.

6. The workpiece shift apparatus as claimed in claim 5, wherein each of the stop blocks comprises a buffer secured therein, for buffering impact between the stop blocks and the large piston rods.

7. The workpiece shift apparatus as claimed in claim 1, wherein the bottom plate comprises a pair of first rails parallel to the second direction, and the middle plate has at least two guideways slidably engaging with the first rails to thereby guide the combined middle plate and top plate to move in the second direction.

8. The workpiece shift apparatus as claimed in claim 1, wherein the middle plate comprises a pair of second rails parallel to the first direction, and the top plate has at least two guideways slidably engaging with the second rails to thereby guide the top plate to move in the first direction.

9. The workpiece shift apparatus as claimed in claim 1, wherein a pair of first railways is secured on the bottom plate parallel to the first direction, a first supporting block is slidably attached on the railways and connected with the first piston rod, and the first small piston cylinder is installed on the first supporting block thereby allowing the first small piston cylinder and the first handspike to move with the first large piston rod.

10. The workpiece shift apparatus as claimed in claim 1, wherein a pair of second railways is secured on the middle plate parallel to the second direction, a second supporting block is slidably attached on the second railways and connected with the second piston rod, and the second small piston cylinder is installed on the second supporting block thereby allowing the second small piston cylinder and the second handspike to move with the second large piston rod.

11. The workpiece shift apparatus as claimed in claim 1, wherein a distance between midpoints of each of two adjacent first cutouts is equal to a distance between midpoints of each of two adjacent first steps, and a distance between midpoints of each of two adjacent second cutouts is equal to a distance between midpoints of each of two adjacent second steps.

12. A workpiece shift apparatus comprising:
a bottom plate;
a middle plate slidably attached on the bottom plate;
a top plate slidably attached on the middle plate and adapted for holding a workpiece thereon;
a first pushing plate slidably attached on the bottom plate and being movable in a first direction, the first pushing plate defining a plurality of first cutouts in one edge thereof, the first pushing plate pushing the combined middle plate and top plate in a second direction perpendicular to the first direction when the first pushing plate is moved in the first direction;
a first pushing means installed on the bottom plate and comprising a first handspike sequentially engaging in the first cutouts to move the first pushing plate in the first direction thereby repeatably moving the combined middle plate and top plate in the second direction;
a second pushing plate slidably attached on the middle plate and being movable in a third direction that is opposite to the second direction, the second pushing plate defining a plurality of second cutouts in one edge thereof, the second pushing plate pushing the top plate in the first direction when the second pushing plate is moved in the third direction; and
a second pushing means installed on the middle plate and comprising a second handspike sequentially engaging in the second cutouts to move the second pushing plate in the third direction thereby repeatably moving the top plate in the first direction.

13. The workpiece shift apparatus as claimed in claim 12, wherein a plurality of arcuate first steps is formed on an opposite edge of the first pushing plate, a first pushing block is secured under the middle plate, a first inner roller is secured on the first pushing block, and a first outer roller is disposed around the first inner roller and rotatable relative to the first inner roller, and wherein when the first pushing plate is moved in the first direction, at least one of the first steps pushes the first outer roller in the second direction to thereby move the combined middle plate and top plate in the second direction.

14. The workpiece shift apparatus as claimed in claim 13, wherein a distance between midpoints of each of two adjacent first cutouts is equal to a distance between midpoints of each of two adjacent first steps.

15. The workpiece shift apparatus as claimed in claim 12, wherein the first pushing means further comprises a first large piston cylinder having a first large piston rod movable in the first direction, and a first small piston cylinder having a first small piston rod movable in the second direction, the first handspike being movable with the first small piston rod in the second direction, the first small piston cylinder and the first handspike being movable with the first large piston rod in the first direction.

16. The workpiece shift apparatus as claimed in claim 15, wherein a pair of first railways is secured on the bottom plate parallel to the first direction, a first supporting block is slidably attached on the first railways and connected with the first large piston rod, and the first small piston cylinder is installed on the first supporting block.

17. The workpiece shift apparatus as claimed in claim 12, wherein a plurality of arcuate second steps is formed on an opposite edge of the second pushing plate, a second pushing block is secured under the top plate, a second inner roller is secured on the second pushing block, and a second outer roller is disposed around the second inner roller and rotatable relative to the second inner roller, and wherein when the second pushing plate is moved in the third direction, at least one of the second steps pushes the second outer roller in the first direction to thereby move the top plate in the first direction.

18. The workpiece shift apparatus as claimed in claim 17, wherein a distance between midpoints of each of two adjacent second cutouts is equal to a distance between midpoints of each of two adjacent second steps.

19. The workpiece shift apparatus as claimed in claim 12, wherein the second pushing means further comprises a second large piston cylinder having a second large piston rod movable in the third direction, and a second small piston cylinder having a second small piston rod movable in the first direction, the second handspike being movable with the second small piston rod in the first direction, the second small piston cylinder and the second handspike being movable with the second large piston rod in the third direction.

20. The workpiece shift apparatus as claimed in claim 19, wherein a pair of second railways is secured on the middle plate parallel to the second direction, a second supporting block is slidably attached on the second railways and connected with the second large piston rod, and the second small piston cylinder is installed on the second supporting block.

21. The workpiece shift apparatus as claimed in claim 12, wherein at least one first spring is connected between the middle plate and the bottom plate for buffering movement of the combined middle plate and top plate relative to the bottom plate, and at least one second spring is connected between the top plate and the middle plate for buffering movement of the top plate relative to the middle plate.

22. A workpiece shift apparatus assembly comprising:

a stationary bottom plate;

a middle plate spatially positioned above the bottom plate;

a first piston cylinder actuating the middle plate to controllably move relative to the bottom plate in a first horizontal direction;

a top plate spatially positioned above the middle plate;

a second piston cylinder actuating the top plate to controllably move relative to the middle plate in a second horizontal direction different from said first direction; and a workpiece being associatively moveable with the top plate; wherein through movements of both the middle plate and the top plate relative to the bottom plate, the workpiece is adapted to be horizontally moveable relative to a punch which is essentially horizontally immovable while vertically moveable so as to form a plurality of punched holes therethrough.

\* \* \* \* \*